United States Patent
Albertini et al.

(10) Patent No.: US 12,188,906 B2
(45) Date of Patent: Jan. 7, 2025

(54) SYSTEM AND METHOD FOR DETECTING A DEFECT IN A RAILWAY TRACK RAIL

(71) Applicants: COMMISSARIAT A L'ENERGIE ATOMIQUE ET AUX ENERGIES ALTERNATIVES, Paris (FR); ALSTOM HOLDINGS, Saint-Ouen-sur-Seine (FR)

(72) Inventors: Julien Albertini, Paris (FR); Bastien Chapuis, Tresserve (FR)

(73) Assignees: COMMISSARIAT A L'ENERGIE ATOMIQUE ET AUX ENERGIES ALTERNATIVES, Paris (FR); ALSTOM HOLDINGS, Saint-Ouen-sur-Seine (FR)

( * ) Notice: Subject to any disclaimer, the term of this patent is extended or adjusted under 35 U.S.C. 154(b) by 282 days.

(21) Appl. No.: 17/787,927

(22) PCT Filed: Dec. 11, 2020

(86) PCT No.: PCT/EP2020/085846
§ 371 (c)(1),
(2) Date: Jun. 21, 2022

(87) PCT Pub. No.: WO2021/130036
PCT Pub. Date: Jul. 1, 2021

(65) Prior Publication Data
US 2023/0024577 A1   Jan. 26, 2023

(30) Foreign Application Priority Data
Dec. 23, 2019   (FR) .................................... 1915428

(51) Int. Cl.
*G01N 29/07*   (2006.01)
*G01N 29/04*   (2006.01)
(Continued)

(52) U.S. Cl.
CPC ........... *G01N 29/07* (2013.01); *G01N 29/043* (2013.01); *G01N 29/4445* (2013.01);
(Continued)

(58) Field of Classification Search
CPC .. G01N 29/07; G01N 29/043; G01N 29/4445; G01N 2291/0234;
(Continued)

(56) References Cited

U.S. PATENT DOCUMENTS 9,516,395 B2 * 12/2016 Foster, III ................ H04Q 9/04
10,457,303 B2 * 10/2019 Schmidt .................. G01H 11/00
(Continued)

FOREIGN PATENT DOCUMENTS

CN   114310935 A   *   4/2022
CN   115881079 A   *   3/2023
(Continued)

OTHER PUBLICATIONS

Srinath et al., A Differential Sensor for Reliable Localization of Potential Cracks in Railway Tracks, 2020 International Conference for Emerging Technology (INCET) Belgaum, India. Jun. 5-7, 2020, p. 4 (Year: 2020).*

(Continued)

*Primary Examiner* — Stephanie E Bloss
*Assistant Examiner* — Kevin C Butler
(74) *Attorney, Agent, or Firm* — BakerHostetler

(57) ABSTRACT

Methods and devices for detecting a defect in a rail of a railway track, include at least two sensors selected from among magneto-acoustic and/or piezoelectric and/or magnetostrictive transducers; each sensor being associated with a timestamping circuit of a GNSS satellite positioning system; a measuring circuit for measuring, by way of the sensors, the acousto-elastic waves propagating in the rail, the wave or signal measurements being timestamped. Some
(Continued)

developments describe notably active and passive modes; the use of train crossings; the emission of waves; the determination of the existence and then of the position and finally the characterization of the defect, where applicable; preferred placements for installing the sensors; the use of inter-correlation, passive inverse filter or correlation of coda of correlation methods; the use of mobile robots and/or drones; the use of artificial noise sources.

8 Claims, 4 Drawing Sheets

(51) Int. Cl.
    *G01N 29/44*         (2006.01)
    *G08B 21/18*        (2006.01)

(52) U.S. Cl.
    CPC ..... *G08B 21/18* (2013.01); *G01N 2291/0234* (2013.01); *G01N 2291/0289* (2013.01); *G01N 2291/105* (2013.01); *G01N 2291/2623* (2013.01)

(58) Field of Classification Search
    CPC ..... G01N 2291/0289; G01N 2291/105; G01N 2291/2623; G08B 21/18
    USPC .......................................................... 73/598
    See application file for complete search history.

(56) References Cited

U.S. PATENT DOCUMENTS

| | | | | |
|---|---|---|---|---|
| 11,572,088 | B2* | 2/2023 | Asuka | B61L 27/53 |
| 11,740,155 | B2* | 8/2023 | Chapuis | G01N 29/46 |
| | | | | 702/34 |
| 2012/0279308 | A1* | 11/2012 | Yan | B61L 23/044 |
| | | | | 73/636 |
| 2014/0238139 | A1* | 8/2014 | Loveday | G01N 29/34 |
| | | | | 702/56 |
| 2015/0281809 | A1* | 10/2015 | Foster, III | H04Q 9/00 |
| | | | | 340/870.26 |
| 2020/0355575 | A1* | 11/2020 | Chapuis | G01N 29/0654 |
| 2023/0024577 | A1* | 1/2023 | Albertini | G01N 29/07 |
| 2023/0349788 | A1* | 11/2023 | Chapuis | G01M 5/0066 |

FOREIGN PATENT DOCUMENTS

| | | | | |
|---|---|---|---|---|
| CN | 116620348 | A * | 8/2023 | |
| CN | 117147693 | A * | 12/2023 | |
| EP | 3473518 | A1 * | 4/2019 | ............... B61K 9/12 |
| FR | 3060743 | A1 * | 6/2018 | ......... G01M 11/083 |
| FR | 3073289 | A1 * | 5/2019 | ......... G01M 5/0066 |
| FR | 3084748 | A1 * | 2/2020 | ............ B61L 23/044 |
| FR | 3105148 | A1 * | 6/2021 | ............ B61L 23/044 |
| WO | 022013 | * | 2/2013 | ............ G01N 29/04 |
| WO | WO-2014027977 | A1 * | 2/2014 | ............ B61L 23/044 |
| WO | WO-2015178868 | A1 * | 11/2015 | ............... B61K 9/10 |
| WO | 2016/076891 | A1 | 5/2016 | |
| WO | WO-2018109159 | A1 * | 6/2018 | ......... G01M 11/083 |
| WO | WO-2020025390 | A1 * | 2/2020 | ............ B61L 23/044 |

OTHER PUBLICATIONS

Goutaudier et al., Real time impact localization using modal superposition—Application to a composite aircraft fuselage, 32nd Congress of the International Council of the Aeronautical Sciences, Sep. 6-10, 2021, p. 10 (Year: 2021).*

Wang et al., An in-situ Structural Health Diagnosis Technique and Its Realization via A Modularized System, IEEE Transactions on Instrumentation and Measurement, vol. 64, No. 4, pp. 873-887, Apr. 2015 (Year: 2015).*

Grigg et al., Development of a low-power wireless acoustic emission sensor node for aerospace applications, Struct Control Health Monit, wileyonlinelibraray, https://doi.org/10.1002/stc.2701, Dec. 11, 2020 p. 18 (Year: 2020).*

Champaigne et al., Wireless Impact and Leak Detection and Location Systems for the ISS and Shuttle Wing Leading Edge, IEEEAC paper #1517, Version 3 Updated Jan. 3, 2005, p. 8 (Year: 2005).*

Hu et al., Wireless Localization of Spallings in Switch-Rails With Guided Waves Based on a Time-Frequency Method, IEEE Sensors Journal, vol. 19, No. 23, Dec. 1, 2019 (Year: 2019).*

Burger, et al., "Large Scale Implementation of Guided Wave Based Broken Rail Monitoring", AIP Conference Proceedings 1650, pp. 771-776, 2015.

* cited by examiner

SYSTEM AND METHOD FOR DETECTING A DEFECT IN A RAILWAY TRACK RAIL

CROSS-REFERENCE TO RELATED APPLICATIONS

This application is a National Stage of International patent application PCT/EP2020/085846, filed on Dec. 11, 2020, which claims priority to foreign French patent application No. FR 1915428, filed on Dec. 23, 2019, the disclosures of which are incorporated by reference in their entirety.

FIELD OF THE INVENTION

The invention relates to the field of structural monitoring in general, and of non-destructive testing in particular.

BACKGROUND

In the railway sector, the rail is a critical element the integrity of which has to be monitored. Subject to very strong thermomechanical stresses (for example internal stresses caused by thwarted thermal expansion, passing of trains), rail sections wear out over time and may sometimes be subject to outright breakages. The state of the tracks has to be monitored in order to reduce or even eliminate risks of derailment.

Multiple approaches are known and implemented to monitor the integrity of the rails.

Breakage detection is performed at present using an electrical system called a "track circuit", which consists in channeling a weak electric current in the rails. When a train enters a given section, its axle short-circuits the two rails. This system thus makes it possible to ensure that the track is free, or that a carriage has not been lost by a preceding train, and therefore that the train is able to enter the track section. Incidentally, this system is able to detect some rail breakages (when the electrical discontinuity is great enough), but not necessarily all damage experienced by the rails during operation. However, this approach has limitations.

There are other approaches, in particular on-board ones. Earlier defects, such as cracks, are detected using visual inspection devices or by sending signals (for example ultrasound, electromagnetic signals) that are generally carried on a maintenance train traveling on or along the tracks. For reasons of detection performance, this device is not able to travel at commercial speeds, but much more slowly, which necessarily causes an inconvenience or even an interruption to traffic (night-time traffic). This type of approach has numerous drawbacks. Given the number of kilometers of rail network to be inspected, a given network section is statistically insufficiently inspected and there is a significant risk of rail breakage before incipient breakage is detected. Moreover, these on-board techniques generally have access only to the surface of the rail, that is to say the upper part of the structure (called the head). They do not cover the inspection of the middle and lower parts of the rail profile.

Another known approach for detecting defects in rails (for example breakage and incipient fracture) consists in placing sensors along the rail that emit guided elastic waves propagating over long distances (typically 1 km). The waves interact with the defects and the diffracted signals make it possible to detect and locate said defects. This type of approach is described in some patent documents, notably US20140238139, WO2014027977A1 and WO2015178868A1, and some scientific articles, for example in the article entitled "*Large Scale Implementation of Guided Wave Based Broken Rail Monitoring*". These technologies, and some variants, are currently marketed. However, these approaches have limitations. The detection of outright breakages is satisfactory overall, but the detection of incipient defects, which is more difficult, remains insufficient. This technical problem is the subject of modern research. The locations of defects are not accurate.

Other known systems also based on the analysis of guided elastic waves are those operating in "pulse-echo" mode, making it possible to detect and locate the defect via the signal reflected by this defect. However, the measurement in pulse-echo mode alone is generally not sufficient to detect small defects (low coefficients of reflection produce extremely weak and undetectable return signals). Furthermore, this type of approach does not make it possible to inspect the entire area located between two nodes for which the separation distance has been determined beforehand for the measurement in transmission mode. Moreover, this type of system is not able, at the same time, to utilize the signals in transmission mode and in reflection mode to reinforce the diagnosis. Known pulse-echo systems have limited coverage, which remains confined close to the nodes of the network. In other words, small defects are impossible to detect in practice far from sensors using current technologies.

Current technologies are also characterized by a low working frequency (low frequency, long waves), so as to ensure propagation over the longest possible distances. For example, one marketed system known in the art uses fiber-optic synchronization, and would be able to use pulse-echo coupling and transmission-mode coupling. However, this type of system operates at a frequency that is too low, the addition or removal of nodes is excessively tricky, the optical fiber is intrinsically fragile and unsuitable for use in challenging environments. To date, the cost of deployment remains high.

There is an industrial need for methods or systems for detecting wear, incipient breakage, and outright breakages of rails.

SUMMARY OF THE INVENTION

The document describes methods and devices for detecting a defect in a rail of a railway track, comprising: at least two sensors selected from among magneto-acoustic and/or piezoelectric and/or magnetostrictive transducers; each sensor being associated with a timestamping circuit of a GNSS satellite positioning system; a measuring circuit for measuring, by way of said sensors, the acousto-elastic waves propagating in the rail, the wave or signal measurements being timestamped. Some developments describe notably active and passive modes; the use of train crossings; the emission of waves; the determination of the existence and then of the position and finally the characterization of the defect, where applicable; preferred placements for installing the sensors; the use of inter-correlation, passive inverse filter or correlation of coda of correlation methods; the use of mobile robots and/or drones; the use of artificial noise sources.

Advantageously, the embodiments of the invention make it possible to detect and then to locate a break on a rail, making it possible to send an alert in order to stop the travel of trains.

Advantageously, the embodiments of the invention make it possible to anticipate incipient breakage (for example cracks), making it possible to anticipate an upcoming fracture and thus to schedule maintenance operations (repair/replacement of the damaged area). Incipient breakage may be detected and then located and then finally monitored over time. Disruptions in traffic that are detrimental for users may thereby be avoided.

Advantageously, distributed embodiments become possible (for example peer-to-peer exchanges between nodes of the network, discovery and mutual recognition, etc.).

In contrast to current technologies operating only in pulse-echo mode, the embodiments of the invention advantageously make it possible to detect incipient breakage over the entire physical area between the nodes, by virtue of the concomitant use of signals in pulse-echo mode and in transmission mode.

The embodiments of the invention are also advantageous in terms of maintenance (for example simplicity, flexibility). Specifically, the system according to the invention is "plug-and-play", that is to say supports the addition and/or removal of a node to and/or from the network without substantial modifications to the rest of the network. This type of modification may moreover be carried out using software. By contrast, the known systems are "chained", i.e. require tricky operations where applicable (for example on the optical fiber, in terms of radio routing, etc.). The deployment and maintenance costs for the system according to the invention are therefore significantly reduced in comparison with existing systems.

BRIEF DESCRIPTION OF THE DRWINGS

Other features and advantages of the invention will become apparent with the aid of the following description and the figures of the appended drawings, in which.

DETAILED DESCRIPTION

Figure 1:
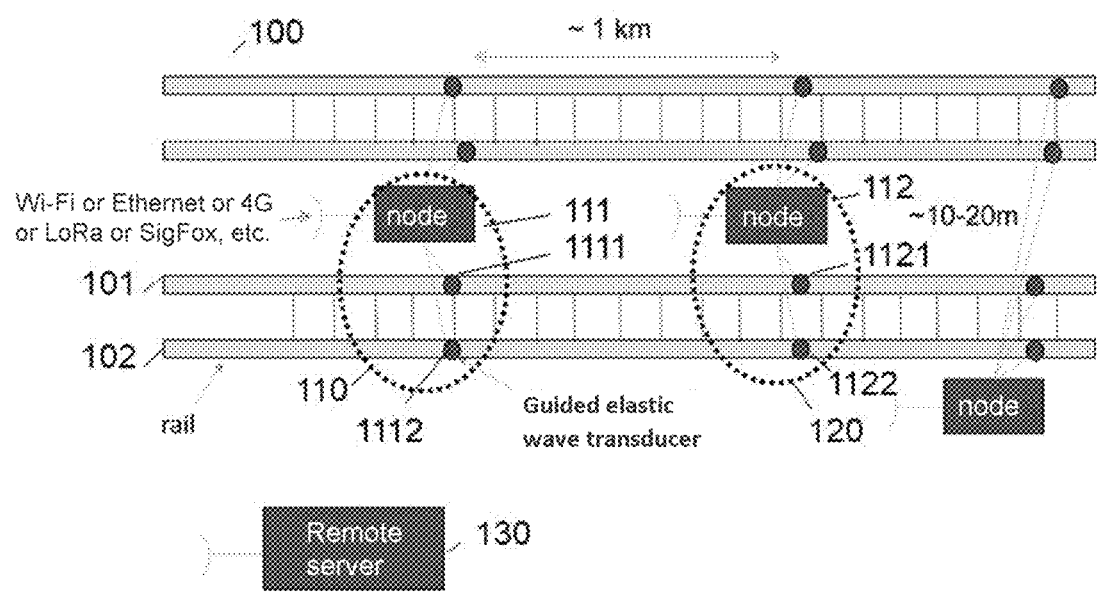
FIG. 1 illustrates one example of a system according to the invention.

A description is given of a system for detecting a defect in a rail of a railway track, comprising: at least two sensors selected from among EMAT magneto-acoustic and/or piezoelectric and/or magnetostrictive transducers; each sensor being associated with a timestamping circuit of a GNSS satellite positioning system; a measuring circuit for measuring, by way of said sensors, the acousto-elastic waves propagating in the rail, the wave or signal measurements being timestamped.

A description is given of a system for detecting a defect in a rail of a railway track, comprising: at least two sensors selected from among EMAT magneto-acoustic and/or piezoelectric and/or magnetostrictive transducers; each sensor being associated with a timestamping unit (or circuit or component or module or subsystem) for timestamping ("able to timestamp" or "configured to timestamp") "measured signals" or "measurements" of "characteristic variables" (notably amplitude and phase; in one embodiment, only the amplitude is necessary and sufficient) of acousto-elastic waves, propagating in the rail and measured by said sensor, each timestamping unit (or circuit or component or module or subsystem) being able to (configured to) receive a synchronization signal from a GNSS satellite positioning system.

A GNSS circuit may be shared between multiple sensors.

In one development, said to be in passive mode, the acousto-elastic waves propagate in the rail when a train passes, and the system comprises a computing circuit configured to determine a function representative of the impulse response of the rail based on the measured signals, said signals being timestamped and then synchronized.

The acousto-elastic field denotes the field of the mechanical waves (sonic, ultrasonic, etc.) propagating in a solid medium. Unlike the case of fluid, there are two types of acoustic wave for a solid material. These waves are better known as elastic waves (shear and compression-traction).

A transducer is a device that converts one physical signal into another. There are a wide variety of transducers. For the generation and reception of acousto-elastic waves being transmitted in a material (a rail, a tube, a structure, etc.), the use of an electromagnetic acoustic transducer (EMAT for short) may be one alternative to using a piezoelectric sensor (PZT for short).

The measurements are performed substantially simultaneously by the sensors: the synchronization may be pre-arranged (arranged by circuits positioned along the track) or post-synchronized (by time offset). In both cases, a very precise clock is advantageously implemented.

A satellite positioning system, known as GNSS (for Global Navigation Satellite System), is based on a constellation of artificial satellites that make it possible to provide a user or a circuit (via a portable receiver) with its position, its speed and the time.

In one embodiment, the GNSS circuits are associated with the sensors so as to precisely timestamp the signals measured by the sensors.

In one embodiment, said to be in active mode, the sensors are configured to receive and/or emit acousto-elastic waves that propagate in the rail. The "synchronized signals" are manipulated.

In one embodiment, said to be in passive mode (use of ambient acousto-elastic noise), the function representative of the impulse response constitutes the appropriate computing intermediary.

In one development, the computing circuit is configured to determine or detect the existence of one or more defects in the rail based on synchronized measurements of the acousto-elastic waves propagating in the rail.

Controlled synchronization allows the phenomenon to be reproduced, i.e. notably makes it possible to compare the responses over time.

A defect may be determined (existence, location, category) by applying predefined thresholds, said predefined thresholds being determined with reference to a real state, for example with respect to a state of the rail known as being healthy or with respect to a calibrated state of said rail, or with reference to a simulated state of the rail.

In one development, the computing circuit is furthermore configured to determine the position of said one or more defects in the rail based on synchronized measurements of the acousto-elastic waves propagating in the rail.

Beyond the existence of a defect (binary answer yes/no), signal comparisons or frequency explorations make it possible to locate, i.e. to determine, the position of a defect.

One or more defects are characterized, notably in terms of nature, size, orientation in space or geometry, through amplitude and/or frequency analysis and/or through analysis of the shape of the signal and/or through analysis of the frequency spectrum of the measured signals and/or of the function representative of the impulse response of the rail and/or through identification of a change in propagation mode of at least one of the waves propagating in the rail.

Incidentally, it becomes possible to restrict alerts only to situations where a defect is detected a predefined number of times or where the measured signals exceed predefined thresholds or threshold ranges.

In one development, the computing circuit is furthermore configured to characterize said one or more defects in the rail based on synchronized measurements of the acousto-elastic waves propagating in the rail.

In one embodiment, the method comprises the step of characterizing one or more defects, notably in terms of nature, size, orientation in space or geometry.

A defect may notably be oriented horizontally or vertically. Based on the signal analysis, the position and the size may be estimated. Through learning or through comparison with charts taken from mathematical or numerical models, a quantitative characterization may make it possible to determine a type of defect (corrosion, crack, discontinuity, etc.).

A defect may be characterized in various ways, depending on the configurations. Characterized may be understood to mean that the nature of the defect is determined (for example incipient crack, outright fracture, corrosion, etc.), and/or that its size and/or its orientation is determined (for example "average" orientation, since defects are rarely straight) and/or that its geometry is determined (achievable in the case of a very large number of sensors).

In one embodiment, a defect is characterized through differentiated diagnosis between the received signal being transmitted via the rail head and the one being transmitted via the rail web. For example, if the signal is transmitted toward one end of the rail and not the other, it is possible to determine approximately the extent of the defect along with its position in the portion of the rail. If no signal is transmitted, it is likely that the fracture in the rail is almost complete.

The latencies associated with the response times of the electronics are negligible and above all indifferent with respect to the delays in establishing synchronization and to its own deviations.

In one development, a sensor is placed or fixed under the rail head.

The advantage of positioning close to the head lies in the fact that guided mode conversions are detectable there. A sensor may be affixed to the rail (EMAT sensor, requiring no adhesive), adhesively bonded temporarily (for example PZT sensor) or permanently to the rail (rail fitted leaving the factory or in situ).

In one development, a sensor is placed or fixed on the inner and/or outer rail web.

The sensors may be placed on both sides of the rail web, on the inner face or on the outer face. Nevertheless, due to the existence of rail-road vehicles, which have wheels encroaching on the outer side, it may be advantageous to place or fix the sensors on the inner face.

The advantage of positioning on the inner wall of the rail web lies in the fact that external attacks are less likely than on the outside. Nevertheless, the positions of the sensors may be variable (either temporarily or permanently). For example, some areas (for example high-speed areas, bends, tunnel entrance, etc.) may be densely fitted.

Moreover, in some embodiments, the sensors and/or the timestamping circuits and/or the computing circuits and/or the GNSS circuits may be distributed in various ways in space (for example existence of centers, fully distributed system, hierarchical arrangement between nodes).

In one development, a function representative of the impulse response of the rail is determined through inter-correlation.

For each pair (A, B) of measurement points in this network, that is to say of sensors, a correlation is performed of the acoustic field u measured simultaneously over a sufficient period of time at A and at B.

It is established that the correlation (strictly speaking its derivative) converges toward a function representative of the impulse response between A and B if the various components of the wave field comply with the condition of equal energy distribution (the phase distribution and amplitude distribution of the waves is random, called the "diffuse field" hypothesis). The impulse response between A and B is the recording that would be obtained at A if a source were to emit a Dirac at B.

The conditions of equal energy distribution may be obtained when the sources are distributed randomly in the medium or when the number and the distribution of the sources is limited but the medium is highly diffusive. Experimental demonstrations have shown that convergence was obtained in frequency ranges of interest for Structural Health Monitoring (SHM), that is to say from kilohertz to a few megahertz.

For example, natural noise sources in industrial structures may be those associated with the turbulent boundary layer in aeronautics, the impact of waves, vibrations induced by engines on a boat or a turbulent flow in a tube.

In practice, this is achieved as follows: for the pair under consideration (A, B), another measurement point Ci from among the set of available points is used. The signals measured between A and B, on the one hand, and Ci, on the other hand, are firstly correlated. Once the correlations CiA and CiB have been performed, the coda of these signals is correlated in order to obtain the correlation between A and B. This may be repeated on some or all of the measurement points Ci, and it is possible to sum all of the correlations obtained in order to obtain a better estimate of the impulse response between A and B.

From the function representative of the impulse response obtained through correlation, the measurement of the time of flight between A and B is deduced. Repeated for all possible pairs of receivers, this operation provides a large number of time of flight data that may be used to perform a propagation speed tomography reconstruction.

In one development, the function representative of the impulse response is obtained through a passive inverse filter method.

In one embodiment, the step of using a passive inverse filter to determine a function representative of the impulse response of the structure to be analyzed comprises the steps of (i) dividing the signals measured on all of the sensors into a plurality of sub-vectors or pseudo-sources and (ii) decomposing monochromatic propagation matrices into singular values.

In one embodiment, the singular values that are obtained may be partitioned into two groups, a first group of values representative of the physical information of interest and a second group of values (which may subsequently be set to zero). Various methods make it possible to determine the thresholding value (in particular according to the regimes of decrease of the singular values when they are ordered).

In one development, the passive inverse filter PIF method corresponds to the steps of: a) temporally dividing the measured temporal signal into a plurality of sub-vectors or pseudo-sources; b) decomposing monochromatic propagation matrices determined based on the pseudo-sources into singular values in the frequency domain; c) obtaining the function representative of the impulse response in the time domain through inverse Fourier transform.

In one embodiment, the step of using a passive inverse filter to determine functions representative of the impulse response of the structure for each of the pairs of sensors interrogated comprises the steps of: —receiving the measured signals for the diffuse elastic field from the N FBG and/or PZT and/or EMAT physical sensors substantially simultaneously, the diffuse elastic field not necessarily complying with a condition of equal energy distribution, said measurements determining a plurality of time vectors; —dividing said time vectors into a plurality of sub-vectors or pseudo-sources; —for each of the pseudo-sources, performing a Fourier transform into frequency w; —for each frequency w: 1) determining the monochromatic propagation matrix H(w) linking the pseudo-sources to the measurement points; 2) determining a plurality of singular values through decomposition of each matrix H(w) into singular values; 3) ordering and thresholding said singular values into a first group of values representative of the physical information of interest and a second group of values set to zero; 4) determining $N^2$ functions representative of the impulse response of the structure (one for each of the pairs of real physical sensors); —determining $N^2$ temporal functions representative of the impulse response of the structure by concatenating the inverse Fourier transforms of the $N^2$ functions representative of the impulse response computed in the frequency domain.

The sub-vectors may be called "pseudo-sources".

In one development, the function representative of the impulse response is obtained through correlation of coda of correlation (C3).

In one development, the correlation measurement comprises an inter-sensor correlation of coda of correlation. This entirely optional development optimizes the device, since it makes it easier to position X on the structure. As a result, the times needed for implementation may be reduced, the positioning errors of the measurement points may be minimized, etc. The "correlation of coda of correlations" consists, for a pair of measurement points A and B, in choosing an arbitrary measurement point Ci selected from among the set of measurement points (except A and B); in correlating the measurements for each of the points A and B with this arbitrary measurement point Ci; in correlating the coda of these correlations in order to obtain the correlation between the measurement points A and B. It is possible to repeat the operation for some or all of the possible measurement points Ci and to sum the correlations obtained in order to obtain a correlation between A and B with better reliability. All this may be applied to all or some of the possible pairs of sensors.

In one development, one or more sensors are removable.

In particular, one advantageous embodiment lies in the fact of having removable sensors, which may for example be removed during maintenance operations.

As a substitute for fitted tracks, or in addition, mobile robots may travel along the railway track (movement over or near the rail, by cable, crawler tracks, wheels, etc.). Drones may also be used. Advantageously, the EMAT sensors do not require very precise positioning with respect to the rail.

In one embodiment, one or more defects are characterized by varying one or more positions of the sensors and/or by selecting sensors from among a plurality, during various iterations of the determination step, each determination step being performed based on the measured signals from the selected sensors.

Increasing the number of sensors improves the processing of the signal and therefore the detection and location of structural defects. The sensors come at a cost, and there are calculable trade-offs.

In one development, one or more sensors are mobile.

Beyond removable sensors, one advantageous embodiment lies in the fact that the sensors are mobile. This makes it possible to study various sections of track, to return to certain locations, etc. The means used to provide mobility are diverse: rolling robots and/or drones may be used. It is also possible to use on-board sensors (for example carried by one and the same train, for example the first sensor being at the front of the train and the second sensor being at the rear of the train). It is also possible to use two trains following one another.

In one development, the energy supply is provided by dynamo systems recharged by the passing of trains over the railway track and/or one or more photovoltaic panels and/or one or more wind towers.

In one development, a computing or signal processing circuit is associated with local and/or remotely accessed computing and/or memory resources.

In one development, the system furthermore comprises one or more artificial noise sources.

In one embodiment, in the passive mode, the system furthermore comprises one or more elastodynamic noise sources such as piezoelectric transducers configured to actively supplement the passive inspection using guided waves.

In one embodiment, the acousto-elastic waves follow (or come from) various propagation paths in the rail, and the measurements are performed in pulse-echo mode, or in transmission mode, from sensors placed on the rail web and/or under the rail head.

A description is given of a method for detecting a defect in a rail of a railway track, fitted with at least two sensors selected from among EMAT magneto-acoustic and/or piezoelectric and/or magnetostrictive transducers, the method comprising the steps of:

receiving a synchronization signal from a GNSS satellite positioning system;

timestamping measured signals of characteristic variables of acousto-elastic waves propagating in the rail and measured by said sensors.

A description is given of a computer program product, said computer program comprising code instructions for performing one or more steps of the method when said program is executed on a computer.

In one embodiment, the system comprises a plurality of paired sensors.

In one embodiment, the method according to the invention comprises the step of comparing the functions representative of the impulse response of the rail determined in various determination steps performed during successive passages of trains or vehicles over the rail.

In one embodiment, the system comprises a circuit configured to emit an alert to the driver and/or to the traffic control system and/or to emit a braking command, said steps being triggered based on the result of the determination of the existence of one or more defects.

In one embodiment, the system comprises one or more artificial noise sources, for generating waves in the rail from the transducer, and for measuring at least one characteristic variable of said waves using the at least one sensor, determining the existence of one or more defects in the rail based on said function representative of the impulse response of the rail and/or on said at least one characteristic variable.

In one embodiment, in the event of an absence of detection, an alert is sent to signal a potential breakage between transmitter and receiver. In order to avoid a false positive (for example if an object impacts the rail and emits a guided wave that the receiver might detect and identify incorrectly as coming from the transmitter), the latter may emit a coded signal, that is to say of a specific shape, and/or which, through its features (shape and frequency content), is not suitable or specific for the detection of incipient defects.

FIG. 1 illustrates one example of a system according to the invention.

The figure shows one example of a system according to the invention deployed along a railway track, with transducers on each rail of said track. The term "on" denotes one or more locations selected from among: under the head, whether on the inner rail web and/or on the outer rail web, under the rail.

In one embodiment, the system according to the invention comprises a plurality of electronic nodes installed along the track, typically every kilometer. A node comprises: a) an energy source (for example battery-type electricity supply, solar panels, access to an external power supply, etc.); b) an electronic circuit comprising i) an elastic wave measurement circuit; ii) an elastic wave emission circuit (this feature is optional; specifically, the embodiments of the invention may be active (emission of signals by the transducers) or passive (ambient acousto-elastic noise); c) signal storage and processing components (System on Chip) for processing received signals; d) a wireless communication circuit (for example Wi-Fi, LAN, LoRa, 3G/4G/5G, NB-IOT, SigFox, etc.); e) a GNSS receiver (for example of GPS type), including the antenna circuit and the on-board electronics, and f) a guided elastic wave transducer, for example installed on a rail at each node.

In one embodiment, a/each node (for example 111, 112) controls one or more transducers (for example 1111, 1112), emits and/or receives the signals, and communicates the result to a remote server 140 connected to a control station 130 for controlling the movement of trains in order to send an alert in the event of a serious defect 110 on a rail 102 (for example).

If a more minor indication is detected, the information is fed back to the maintenance center or to the control station to monitor the progress of the severity and schedule repair or replacement of the rail.

Each transducer may function both as transmitter and as receiver. Multiple signals may therefore be used by the system. In the figure, the wave transmitted from the transmitter 1111 to the receiver 1121 and vice versa, along with the waves reflected when transmitter 111 (or 112) operates in pulse-echo mode (the same transducer acts as transmitter and receiver).

The absence of a transmitted wave provides information about a complete (or at least very severe) fracture of the rail between 1111 and 1121, without a more precise location. In this case, the time of flight of the reflected wave allows precise location of the breakage, the diagnosis possibly being reinforced by the reflected wave emitted by the transducer located on the other side.

Figure 2:
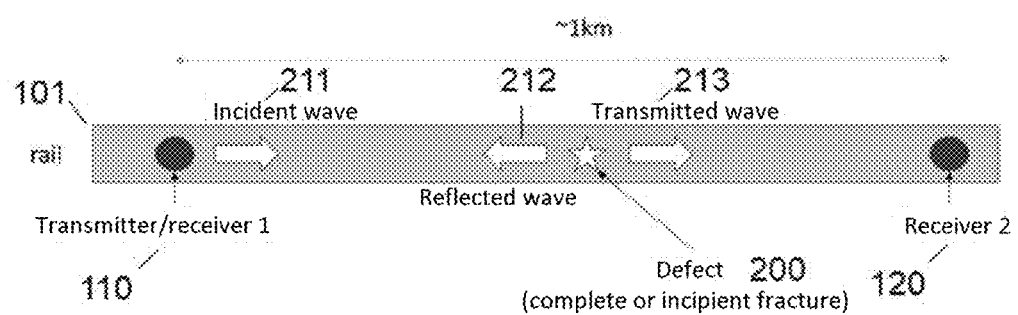
FIG. 2 illustrates the various types of waves propagating between two sensors.

FIG. 2 illustrates the various types of waves propagating between two sensors.

In the event of a defect less severe than a complete fracture of the rail (crack for example), the transmitted wave 213 makes it possible to detect and possibly locate the defect 200 or even to characterize it (estimate its severity), but this requires precise knowledge of the time of flight of the wave. Given the propagation speeds involved (typically 3000 m/s), the receiver of the node (110 or 120) needs to know precisely the emission pip in order to compute the signal observation window and measure the time of flight. The synchronization between transmitter and receiver should generally be less than a microsecond.

At a lower detection range, the reflected wave (212) may possibly also provide information about the presence, the location and the severity of the defect.

Synchronization According to the Invention (Details)

The details of the GNSS-based synchronization according to the invention are described below.

In one embodiment, each node knows a priori (or the server sends to it) the state (transmitter or receiver) in which it should be on a very precise date, and when it arrives at this date it automatically performs the operation that it has to perform.

In one advantageous embodiment, the synchronization is performed on a low hardware or software level, thereby avoiding or reducing internal latencies (for example relating to the operating systems). This embodiment may correspond to what is known as a System on Chip implementation.

The signal may then undergo one or more pre-processing operations at a node. Higher-level or lower-level information about the state of health of the rail (for example information relating to the severity of the defect) may be sent to the server.

In practice, the synchronization between two nodes in active mode according to the invention is described below. Each node knows a priori (or the server sends to it) the state (transmitter or receiver) in which it should be on a very precise date (to within a microsecond). When it arrives at this date, the node automatically performs the operation that is has to perform (emit or receive the waves). On the given date (for example 14h 00 min 00 s 000 ms 000 μs), the node that has to emit emits the signal and then switches to reception mode to measure the reflected signal in pulse-echo mode. At the same time, shifted by an offset linked to the (known) distance between the two nodes and the propagation speed of the wave (also known), the receiver node activates its reception circuit.

The offset is typically of the order of 300 ms (for 2 nodes separated by 1 km and a propagation speed of 3000 m/s), that is to say that the receiver node starts listening at 14 h 00 min 00 s 300 ms 000 μs, for a typical duration of 100 ms. Each sample of this signal is precisely timestamped, i.e. it is associated with an absolute time accurate to within less than one microsecond, by virtue of the GNSS timestamp. The receiver node knowing the real emission pip and therefore optimizing the listening window (in terms of position and in terms of duration) has two advantages: the signal is received only over a very short window, thereby minimizing the risk of a false alarm. Moreover, since the electronic circuits are activated only over a very short time, the energy consumption of the system is reduced to a minimum, this being advantageous for an on-board system.

In order to improve the signal-to-noise ratio, the emission (firing)/reception operation is repeated multiple times, up to around one hundred times, and the various received signals are averaged to reduce noise. For the averaging operation to have a physical meaning, the signals should be in phase, that is to say that the synchronization between transmitter and receiver should be much lower than the period of the signal (that is to say <μs for excitations of the order of a few tens to hundreds of kHz). The averaged signal makes it possible to ensure that the peak received in the signal is indeed linked to a propagation of elastic waves emitted by the transmitting transducer and not linked to electromagnetic and/or elastic interference, which could lead to a false alarm if the diagnosis were to be based solely on an amplitude threshold being crossed.

In one embodiment, the synchronization between two nodes in passive mode according to the invention takes place as follows. Upon a pip (starting signal) linked to the presence of an elastic noise source (for example the arrival of a train, which increases the noise level measured at the rails well before it passes the nodes), the two nodes go into reception mode for a determined duration (typically a few tens of seconds). The two measurement ranges are not exactly identical because the waking of the nodes is not necessarily simultaneous (an external pip leads to a waking time for the electronics, which is quite similar from one node to another but not to within a µs in any case; an internal pip linked to the crossing of a noise level leads to a much lower overlap, and so the acquisition duration has to be sufficient). The signals are nevertheless timestamped in an absolute manner for each of the nodes. The signals are either sent by each of the nodes to a remote server or gathered on one and the same node for local computing.

Computing the inter-correlation of the signals restricted to the portion where the acquisitions overlap makes it possible to estimate the impulse response between the two sensors. It is necessary to interpolate the signals to revert exactly to the same time base.

In one embodiment, the nodes all operate in continuous reception mode in order to capture what are known as acoustic emission signals resulting from the elastic energy emitted when a defect of cracked rail type is created/propagates. With the nodes sharing a common time base, the precise time of arrival (corresponding to the crossing of a predefined amplitude threshold, greater than ambient noise in order to avoid false alarms) of the signal at two adjacent nodes is compared in order to establish the precise location of the crack.

Delta x=½ (L−V*delta t), L being the distance between nodes and V being speed. With L=1 km and V=3000 m/s (speed of sound in iron), the synchronization should be performed to within 1 millisecond (ms, 10^-3) for a location only 1.5 m away. Synchronization to within 1 microsecond (us, 10^-6) allows centimeter-accurate location.

Controlled synchronization between the nodes therefore guarantees good location of the defect.

Moreover, controlled synchronization allows the phenomenon to be reproduced in a given very precise area and makes it possible to launch an alert only when it is reproduced multiple times.

Synchronization According to the Invention (Advantages)

The advantages of the GNSS-based synchronization according to the invention are described below.

The use of a GNSS system, for example GPS, to synchronize ultrasound signals for application to non-destructive testing (structural health testing) does not exist in the known prior art. This use is described only in sole cases of geophysical application (synchronization of geophysical elastic waves).

Advantageously according to the invention, a synchronization mechanism between remote sensors allows precise location of a defect. A sensor that receives an elastic wave (ambient or guided) does not in fact "know" the time at which this wave was emitted. The signal in transmission mode makes it possible to determine that the physical medium serving as an elastic waveguide is "continuous" or at least "uninterrupted" between the transmitter sensor and the receiver sensor. At a given time, the transmitter sensor emits a wave and the receiver sensor measures the signals received continuously (over a given time window) in order to capture the wave that has propagated.

Advantageously, having this GNSS-based synchronization means that there is no need to run an optical fiber (or an electric cable) along the track. The synchronization solution that is adopted means that the methods and devices may easily be deployed in practice. From a hardware point of view, all of the nodes of the deployed network are independent. In particular, it is possible to easily remove, respectively to add, a node from, respectively to, the network, for example in the event of a modification to the geometry of the railway track or failure of a node. For example, it is possible to insert or to remove a splice bar (for example replacement by a weld or vice versa).

Advantageously, the clock synchronized by GNSS (time precision) makes it possible to achieve improved precision in terms of location (spatial precision). The use of GNSS makes it possible to precisely synchronize the nodes, i.e. to guarantee that they share the same time base. A node or sensor in reception mode may thus be associated with exact time information, which provides information about the date of emission of the signal. In terms of orders of magnitude, the nodes are synchronized at time intervals that should be less than a microsecond (millionth of a second), in order to be sufficiently precise with respect to the propagation of the elastic waves. On this time scale, it is not possible to rely on the internal clock of the nodes, because the drifts are very quickly too great between two given nodes. Resynchronization for example via the Internet is also not possible to implement, because the latency in the network is too great there.

Among multiple technical solutions, one solution may consist in using what is known as the PPS ("Pulse Per Second") signal, which is sent by the GNSS system every second. This signal is calibrated to the atomic clock on board the GNSS satellites. It allows synchronization to within a few tens of nanoseconds, at a very limited cost (much less than if it were necessary to house an atomic clock in each node).

In practice, according to one embodiment, a/each node receives the PPS signal in order to synchronize to within a few tens of nanoseconds nearly every second. The drift observed between two nodes from one second to the next is much less than a microsecond, thereby guaranteeing sufficient precision with respect to the propagation of guided elastic waves.

In some variant embodiments, the synchronization between the nodes is obtained using other methods (for example through radio or even wired synchronization). Radio or wired synchronization variants are comparatively more expensive. In addition, GNSS coverage is worldwide and inexpensive.

Figure 3:
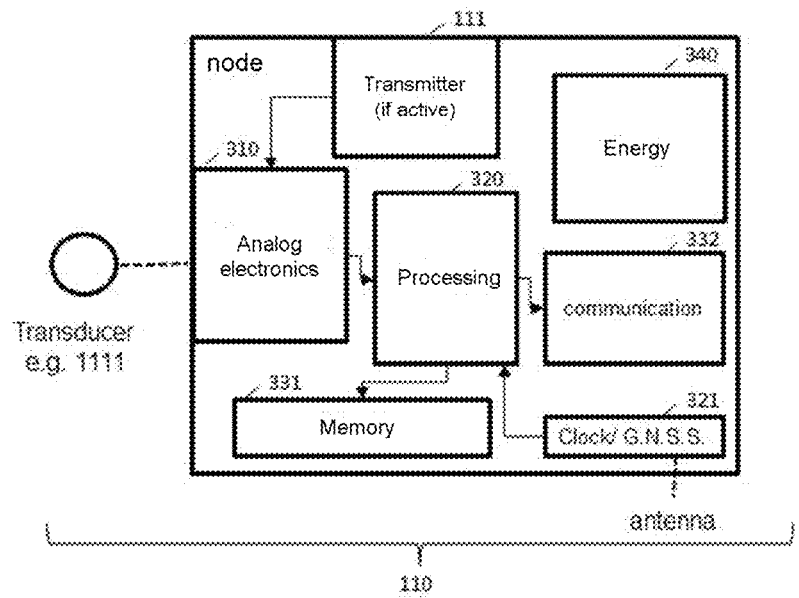
FIG. 3 illustrates one example of a structure of a node for capturing signals according to the invention.

FIG. 3 illustrates one example of a structure of a node 110 for capturing signals according to the invention. This electronic node makes it possible notably to perform these functions of emitting and receiving waves, of communicating with the remote server, while at the same time guaranteeing synchronization of less than a microsecond between two nodes spaced by several kilometers (the distance does not matter as long as there is GNSS coverage on the two nodes under consideration).

In one embodiment, a "node" or "hub" 111 (pooling the electronic resources) may control multiple physical sensors or "measurement points". Each measurement point for example 110 or 120 may comprise one or more sensors (of the type 1111, 1112). A node 111 may comprise communication resources (wired or wireless, for example 4G, 5G, Wi-Fi, Ethernet, optical fiber, etc.), so as to centralize the data in a processing center 130 (for example synchronization, alerts, etc.). Data may be captured and transmitted continuously, or else retrieved once a day, or on the fly when a train passes, etc.

In a passive approach, the data to be transmitted may be bulky (typically a few megabytes MB instead of a few bytes or hundreds of bytes in the active case). Depending on the communication protocols implemented, this may be a point to be taken into consideration.

In one embodiment, a node may have the ability of controlling the sensors both in transmission mode and in pulse-echo mode in active and passive mode ("generic" node). In some embodiments, one or more nodes may be optimized in terms of functionality and cost.

A node 111 according to the embodiments of the invention may comprise various components. A node may comprise a transmitter in the active case. In passive mode, there is no transmitter since the energy of the train is used. The signals from the sensors, for example 1111, are received by an analog/digital electronic circuit and then processed by a circuit 320 (FPGA, CPU or the like), which communicates the data 332 and/or stores them 331 locally. In one embodiment, a node may comprise a GNSS (acronym for "Global Navigation Satellite System") module, for example GPS or Galileo or GLONASS or Beidou-2 (COMPASS). This GNSS circuit is advantageous for identifying the position of the node once it has been positioned on the track, but also for dating the signals precisely (dating precise to within a few nanoseconds allows post-processing synchronization).

Regarding the energy source 340, various embodiments are described.

In one embodiment, the sensor node is autonomous and communicating. In one embodiment, the node recovers vibrational energy using the piezoelectric sensors adhesively bonded to the rail and/or from the blast of air when a train passes (mini-wind turbine, for example when the system is in a tunnel), and/or a solar panel. In one embodiment, the node comprises a battery. In other embodiments, more transient energy storage systems are used (for example supercapacitors, by recovering energy when a train passes, therefore over a very short time).

Figure 4:
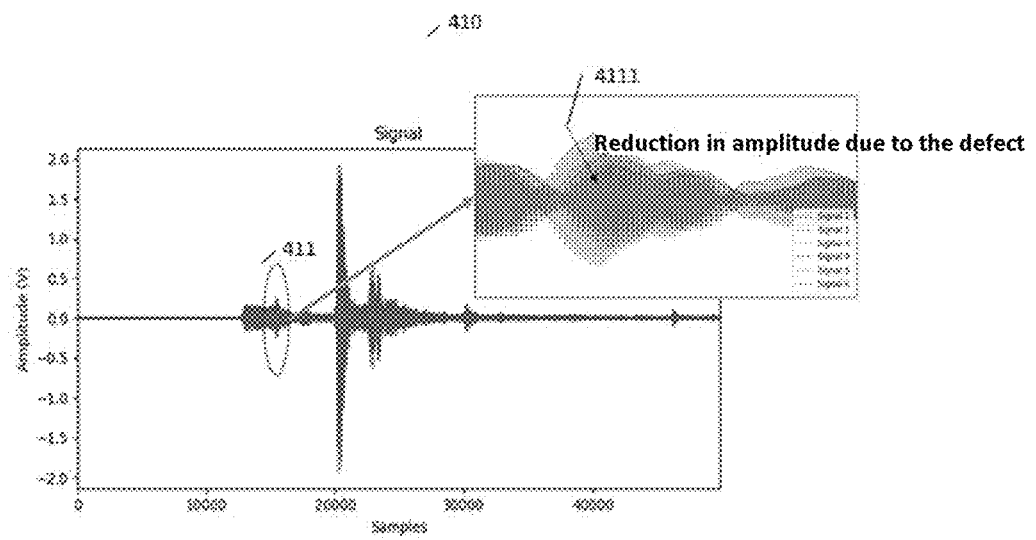
FIG. 4 shows a variation of a signal measured in transmission mode between two nodes spaced by 400 meters and synchronized by GNSS.

FIG. 4 shows one example of a signal 410 measured in transmission mode between two sensors positioned under the head and spaced by 400 meters and synchronized by GPS. The emitted signal, therefore in this case according to an active interrogation mode, is a burst consisting of 5 sinusoid cycles with a center frequency of 40 kHz.

A signal portion 411 is isolated and enlarged: a signal variation 4111 is measured in transmission mode, for a defect of increasing size. The defect in this case is an artificial notch in the rail head (representative of defects called "partial rail break" in the jargon), from 5 to 25 mm deep and around 11 mm long. The signal 1 corresponds to a healthy rail, and the signal numbered 6 corresponds to a defect of maximum size. The figure illustrates the change in amplitude due to the defect, which makes it possible to detect the presence thereof. In this case, the amplitude carries information about the severity of the defect (characterization).

The invention may be implemented on the basis of hardware and/or software elements. It may be available as a computer program product on a computer-readable medium. The medium may be electronic, magnetic, optical or electromagnetic. The computing means or resources may be centralized and/or distributed ("cloud computing"), possibly with or using peer-to-peer and/or virtualization and/or redundancy technologies. The software code may be executed on any suitable processor (for example a microprocessor) or processor core or set of processors, whether these are provided in a single computing device or distributed between several computing devices. The computing implementation of the invention may use centralized systems (for example client-server or master-slave) and/or distributed systems (for example peer-to-peer architecture using accessible computing resources, possibly opportunistically, for example ad-hoc networks, etc.). The system (or its variants) implementing one or more of the steps of the method may use one or more dedicated electronic circuits or a general-purpose circuit. The method may also be implemented on a reprogrammable computing machine (a processor or a microcontroller for example) executing a program comprising a sequence of instructions, or on a dedicated computing machine (for example a set of logic gates such as an FPGA or an ASIC, or any other hardware module). A dedicated circuit may notably improve performance. The reference to a computer program that, when it is executed, performs any one of the previously described functions is not limited to an application program running on a single host computer. On the contrary, the terms computer program and software are used here in a general sense to refer to any type of computer code (for example application software, firmware, microcode, APIs, web services, or any other form of computer instruction) that may be used to program one or more processors so as to implement steps of the method.

The invention claimed is:

1. A system for detecting a defect in a rail of a railway track, comprising:
    at least two sensors selected from among EMAT magneto-acoustic and/or piezoelectric and/or magnetostrictive transducers, said system consisting of an active mode, wherein said sensors are configured to receive and/or emit acousto-elastic waves that propagate in the rail;
    wherein each said sensor being respectively associated with a timestamping unit able to timestamp measured signals received by said sensor, the signals being signals of characteristic variables of emitted acousto-elastic waves propagating in the rail, each said timestamping unit being able to receive a synchronization signal from a GNSS satellite positioning system to locally timestamp said signals; and
    a computing unit for determining or detecting the existence of one or more defects in the rail.

2. The system as claimed in claim 1, wherein the measured signals are synchronized, and the computing unit is configured to determine or detect the existence of said one or more defects in the rail based on the timestamped and synchronized measured signals.

3. The system as claimed in claim 2, wherein the computing unit is furthermore configured to determine the position of said one or more defects in the rail based on the synchronized measured signals.

4. The system as claimed in claim 3, wherein the computing unit is furthermore configured to characterize said one or more defects in the rail based on the synchronized measured signals.

5. The system as claimed in claim 1, wherein at least one of said sensors is placed or fixed under the rail head, and/or on the inner and/or outer rail web.

6. The system as claimed in claim 1, wherein the energy supply is provided by dynamo systems recharged by the passing of trains over the railway track and/or one or more photovoltaic panels and/or one or more wind towers.

7. A method for detecting a defect in a rail of a railway track, said railway track being fitted with a system as claimed in claim 1, the method comprising the steps of:
- receiving, by way of each timestamping unit associated with each sensor, the synchronization signal from the GNSS satellite positioning system;
- locally timestamping the measured signals received by said sensor, the signals being signals of characteristic variables of the emitted acousto-elastic waves propagating in the rail; and
- determining or detecting the existence of the one or more defects in the rail from the timestamped received signals.

8. A computer program product, said computer program comprising code instructions for performing the steps of the method as claimed in claim 7 when said program is executed on a computer.

* * * * *